United States Patent
Ootera et al.

(10) Patent No.: US 7,400,570 B2
(45) Date of Patent: Jul. 15, 2008

(54) OPTICAL DISK

(75) Inventors: Yasuaki Ootera, Kawasaki (JP); Naoki Morishita, Yokohama (JP); Seiji Morita, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 572 days.

(21) Appl. No.: 11/012,071

(22) Filed: Dec. 15, 2004

(65) Prior Publication Data

US 2005/0141405 A1 Jun. 30, 2005

(30) Foreign Application Priority Data

Dec. 26, 2003 (JP) ............................. 2003-434919

(51) Int. Cl.
*G11B 7/24* (2006.01)
(52) U.S. Cl. .................... 369/275.4; 369/277; 428/64.4
(58) Field of Classification Search ................ 369/277, 369/278, 279, 275.1–275.5, 283, 288; 428/64.4; 430/270.11; 720/718
See application file for complete search history.

(56) References Cited

U.S. PATENT DOCUMENTS 6,728,198 B2 * 4/2004 Fujii et al. ............... 369/275.4
6,874,156 B2 * 3/2005 Takagishi et al. ........... 720/718
2002/0127367 A1 * 9/2002 Shibata ...................... 428/64.4
2003/0003261 A1 * 1/2003 Saito et al. ................. 428/64.4
2003/0064192 A1 * 4/2003 Berneth et al. ............. 428/64.4
2004/0058274 A1 * 3/2004 Fukuzawa et al. ....... 430/270.11

FOREIGN PATENT DOCUMENTS

JP       2003-203391        7/2003
JP     2003203391   A  *   7/2003

OTHER PUBLICATIONS

Machine translation of JP 2003203391 A.*

* cited by examiner

*Primary Examiner*—Ali Neyzari
(74) *Attorney, Agent, or Firm*—Pillsbury Winthrop Shaw Pittman, LLP

(57) ABSTRACT

An optical disk according to the present invention has a guide groove formed with a width which is not less than 80 nm and not more than 170 nm in terms of a half-value width. A depth of the guide groove is formed within a range in which $(n_1-n_2) \cdot d_1 + n_2 \cdot d_2 = (2m-1) \cdot \lambda/4$ is ±15%, wherein $n_1$ is a refractive index of a substrate, $n_2$ is a refractive index of a recording film, $\lambda$ is a wavelength of light beams used for recording and reproduction of information, $d_1$ is a depth of the guide groove, $d_2$ is a depth of the recording film positioned on the guide groove, and m is an integer (m=1, 2, 3, 4 ... ).

9 Claims, 3 Drawing Sheets

OPTICAL DISK

CROSS-REFERENCE TO RELATED APPLICATIONS

This application is based upon and claims the benefit of priority from prior Japanese Patent Application No. 2003-434919, filed Dec. 26, 2003, the entire contents of which are incorporated herein by reference.

BACKGROUND OF THE INVENTION

1. Field of the Invention

The present invention relates to an information recording medium such as an optical disk, and more particularly to a direct-read-after-write optical disk using an organic dye film for a recording film.

2. Description of the Related Art

As optical disks as information recording mediums, there are a reproduction-only optical disk as typified by a CD or a DVD-ROM, a write once read many optical disk as typified by a CD-R or a DVD-R, a rewritable optical disk as typified by a CD-RW, a DVD-RAM or a DVD-RW which can be utilized in an external memory for a computer or a recording/reproducing video machine, and others.

Of the above-described optical disks conforming to various standards, in the write-once read-many optical disk, a groove (guide groove) formed on the optical disk is wobbled and address information is provided to the groove.

Many of the direct-read-after-write optical disks take a structure in which an organic dye film with a predetermined thickness is deposited in a groove previously formed when molding the disk.

On the other hand, the direct-read-after-write optical disk must include a prepit (groove in which physical information is recorded) such as a lead-in groove in order to maintain compatibility with a reproduction-only optical disk.

However, since an organic dye material as a recording film is applied on the prepit previously formed on a substrate, it is known that a depth of the prepit may not be necessarily even.

On the basis of such a background, in Jpn. Pat. Appln. KOKAI Publication No. 2003-203391, the following expression is specified:

$$\lambda/4 \leq (n_1-n_2)d_1+n_2 \cdot d_2 \leq \lambda/2$$

wherein $n_1$ is a refractive index of a disk substrate,
$n_2$ is a refractive index of a dye,
$\lambda$ is a wavelength of light beams,
$d_1$ is a depth of a prepit (groove) on the disk substrate, and
$d_2$ is a depth of the prepit (groove) on the dye.

However, in the direct-read-after-write optical disk which is used based on the standard in which a wavelength of laser beams utilized for recording is reduced to approximately 400 nm (reduction in diameter of a condensing spot diameter) for the purpose of increasing a recoding density, even if depths of the pit and the groove portion are to be specified by using the condition described in the patent cited reference 1, since a track pitch (distance between grooves) is narrower than a spot diameter of light beams used for recording and reproduction of information, there is a problem that an optimum value achieving both a signal amplitude of the pit portion and the tracking stability of the groove portion cannot be obtained.

It is to be noted that, in an optical disk utilizing a wavelength of laser beams for recording of approximately 400 nm, the extent to which the pit is filled with an organic dye material used for a recording film is decided by the width of the pit, and, as the pit depth fluctuates, the quantity of the dye material which enters the pit must be uniformized.

BRIEF SUMMARY OF THE INVENTION

According to an aspect of the present invention there is provided an optical disk comprising:

a recording film which includes an organic dye material with which information can be recorded when applied with light beams having a predetermined wavelength;

a substrate which holds the recording film together with a guide groove which is used to guide the light beams having the predetermined wavelength and has a width which is not less than 80 nm and not more than 170 nm in terms of a half-value width;

a reflection film which is provided with a predetermined thickness on a side opposite to the substrate side of the recording film; and a second substrate which is stacked against the reflection film through a bonding layer.

According to another aspect of the present invention there is provided an optical disk comprising:

a recording film which includes an organic dye material with which information can be recorded when applied with light beams having a predetermined wavelength;

a substrate which includes a guide groove specified by the following conditions in order to guide the light beams having the predetermined wavelength:

$$(n_1-n_2) \cdot d_1+n_2 \cdot d_2=(2m-1) \cdot \lambda/4$$

wherein $n_1$ is a refractive index of the substrate,
$n_2$ is a refractive index of the recording film,
$\lambda$ is a wavelength of light beams used for recording and reproduction of information,
$d_1$ is a depth of the guide groove,
$d_2$ is a depth of the recording film positioned on the guide groove, and
m is an integer (m=1, 2, 3, 4 . . . );

a reflection film which is provided with a predetermined thickness on a side opposite to the substrate side of the recording film; and a second substrate which is stacked against the reflection film through a bonding layer.

According to still another aspect of the present invention there is provided a method for manufacturing the optical disk which comprises a recording film having an organic dye material as a recording material with which information can be recorded when applied with light beams having a predetermined wavelength, a substrate which holds the recording film together with a guide groove which is used to guide the light beams having the predetermined wavelength, a reflection film which is provided with a predetermined thickness on a side opposite to the substrate side of the recording film, and a second substrate which is appressed against the reflection film through a bonding layer, the optical disk having a hole with an inside diameter of 15 mm and having an outside diameter of 120 mm, the method comprising:

forming in an area whose radius from the center is 23.3 to 23.8 mm and an area whose radius from the center is 57.9 to 58.0 mm the guide groove having physical information of a half-value width of not less than 80 nm and not more than 170 nm as well as a depth which is in a range of ±15% of the following expression:

$$(n_1-n_2) \cdot d_1+n_2 \cdot d_2=(2m-1) \cdot \lambda/4$$

wherein $n_1$: a refractive index of the first substrate, $n_2$: a refractive index of the recording film, λ: a wavelength of the light beams used for recording and reproduction of information, $d_1$: a depth of the guide groove, $d_2$: a depth of the recording film positioned on the guide groove, and m: an integer (m=1, 2, 3, 4 . . . );

forming the reflection film on the substrate having the guide groove provided thereto;

providing the bonding layer on the reflection film; and bonding the second substrate through the bonding layer.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment according to the present invention will now be described in detail hereinafter with reference to the accompanying drawings.

Figure 1:
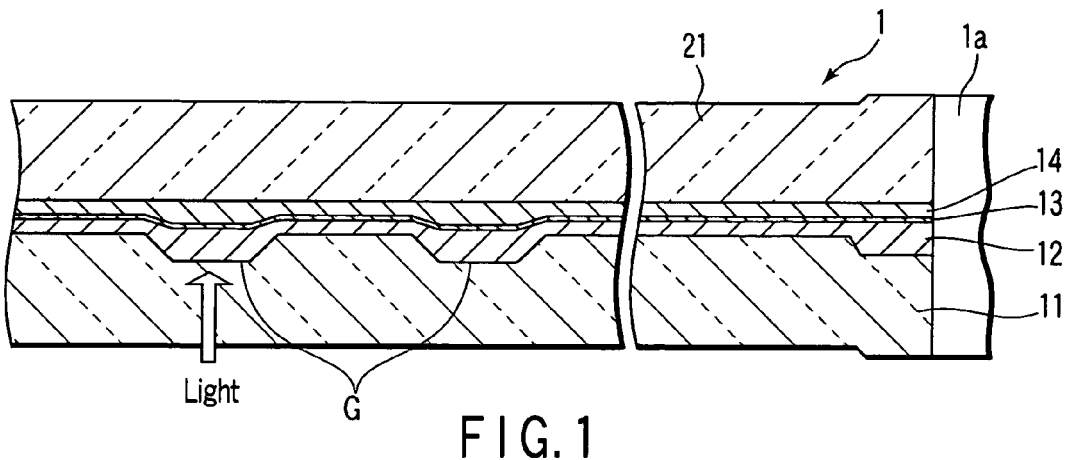
FIG. 1 is a schematic view illustrating an example of a structure of an optical disk to which an embodiment according to the present invention is applied.

As shown in FIG. 1, an optical disk 1 as a recording medium comprises a first transparent substrate 11, a second transparent substrate 21 provided to be opposed to the first transparent substrate, a recording layer 12, a reflection layer 13 and a bonding layer 14 layers of which are provided between the both substrates in the mentioned order from the first transparent substrate 11 side. It is to be noted that a central hole 1a having a diameter of 15 mm is formed at the center of the optical disk 1, i.e., the first and second substrates. Further, a diameter of each of the substrates 11 and 21 is 120 mm, a thickness of the same is approximately 0.6 mm, and a total thickness of the disk 1 including the recording layer 12, the reflection layer 13 and the bonding layer 14 is approximately 1.2 mm.

Although not shown, a system lead-in area and a system lead-out area in which physical information (prepit) inherent to the optical disk is previously recorded are provided in an area whose radius from the center is approximately 23.3 to 23.8 mm and an area whose radius from the center is 57.9 to 58.0 mm in the optical disk 1.

Furthermore, in the optical disk 1, a track pitch of a groove portion is 400 nm. It is to be noted that, in the lead-in area and the lead-out area, a track pitch is determined as 0.68 μm (680 nm) and a length of a shortest pit among preformed pits is determined as 0.408 μm (407 nm). It is needless to say that a wavelength of light beams utilized for, e.g., recording and reproduction or the track pitch may be shorter (narrower).

It is to be noted that the optical disk 1 is of a direct-read-after-write type in the present invention, but it is not restricted to this embodiment. Moreover, light beams utilized for recording and reproduction are determined as laser beams having a wavelength of 400 nm, and an object lens whose numerical aperture NA is determined as NA=0.65 is used in an optical unit utilized for recording and reproduction of information.

Figure 3:
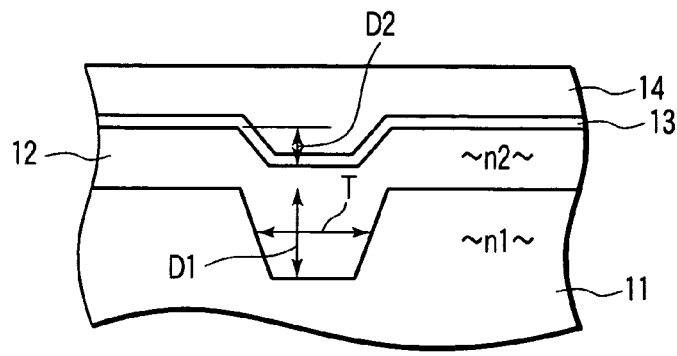
FIG. 3 is a schematic view illustrating an example of a condition of a depth which is applicable to a prepit (groove including a pit) of the optical disk having a recording film composed of an organic dye depicted in FIG. 1.

A groove (guide groove) 11a which will be described below with reference to FIG. 3 is formed on a surface of the first substrate 11 on the recording layer 12 side. It is to be noted that the groove 11a takes, e.g., one spiral shape which is continuously formed from the central hole 1a side toward the outside diameter direction, and a distance between adjacent grooves is formed into a wobble which varies in a predetermined cycle.

A diazo-based or phthalocyanine-based organic dye material is formed with a predetermined thickness to the recording layer 12.

For example, Al or Ag is formed with a predetermined thickness to the reflection layer 13 by a technique such as sputtering.

The bonding layer 14 is, e.g., an ultraviolet curing adhesive which is hardened when applied with ultraviolet rays (UV rays), and it can be arbitrarily selected from resins having the viscosity of, e.g., approximately 300 to 5000 CPS.

The second substrate 15 is, e.g., molded with respective steps to manufacture the groove 11a, the recording layer 12 and the reflection layer 13 being eliminated from steps to produce the first substrate 11, and a transparent resin plate formed to have a predetermined thickness in advance has a discoid shape by press working or the like. A label area in which character information, a photograph or the like can be printed may be formed on a surface of the second substrate 15 opposite to the bonding layer 14 according to needs.

Figure 2:
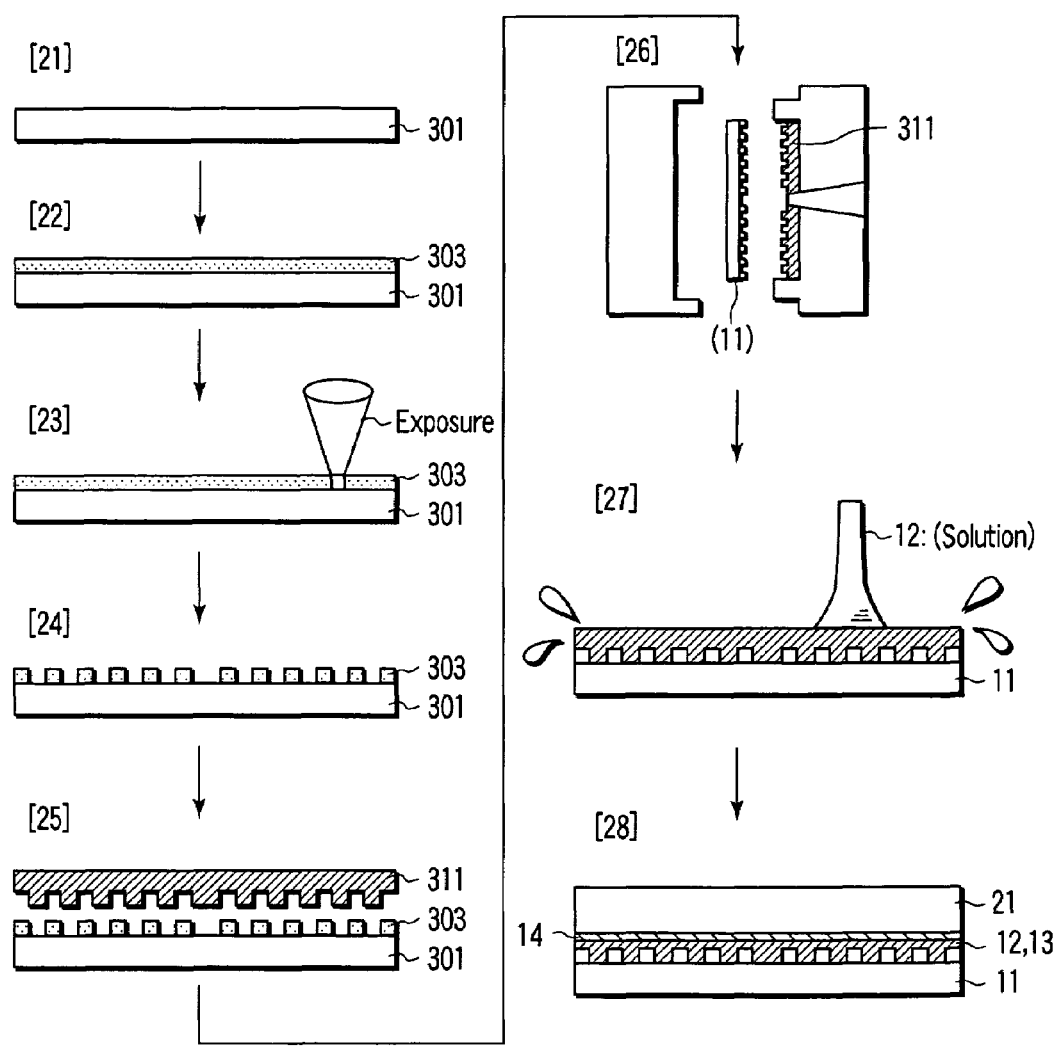
FIG. 2 is a schematic view illustrating an example of steps to manufacture the optical disk depicted in FIG. 1.

Steps to manufacture the optical disk depicted in FIG. 1 will now be briefly described hereinafter with reference to FIG. 2. It is to be noted that each step shown in FIG. 2 is of course associated with an example of the operation of a recording medium manufacturing apparatus for manufacturing a recording medium, although not described in detail.

First, as illustrated in a step [21], a glass disk, whose surface is polished to obtain a predetermined surface roughness and then cleansed is prepared as an original disk 301.

Then, as shown as a step [22], a photoresist 303 is applied on a surface of the glass original disk 301. Subsequently, as illustrated as a step [23], exposure is carried out with laser beams having a predetermine wavelength in order to record physical information (pit), a guide groove (irregularities, i.e., a wobble groove) or the like. It is to be noted that the physical information (pit) recorded here is of course prepared for the system lead-in area or the system lead-out area alone.

Then, the exposed glass original disk 301 is developed, and an undeveloped part of the photoresist is removed, thereby obtaining irregularities like pits such as shown in a step [24].

Thereafter, as illustrated in a step [25], the glass original disk 301 obtained at the step [24] is subjected to plating processing in order to create a stamper 311.

Then, as illustrated in a step [26], a resin molded plate (corresponding to the first substrate 11 shown in FIG. 1) is created by injection molding with the stamper 311 being used as a mold. It is to be noted that, e.g., polycarbonate is used as a substrate material.

Subsequently, as shown in a step [27], an organic dye which becomes a recording medium (12) is applied with a predetermined thickness on the molded plate (11) corresponding to the first substrate by, e.g., a spin coating method, and then it is hardened by a predetermined drying method.

Thereafter, as shown in a step [28], a reflection layer 13 is formed on the recording layer (12), and then the substrate corresponding to the second substrate 21 created by different steps is attached on the layer by using an adhesive 14, thereby bringing an optical disk to completion.

It is to be noted that, if the adhesive 14 is, e.g., a UV curing resin which is hardened when applied with ultraviolet rays (UV rays), a predetermined quantity of the UV curing resin is first dropped on the reflection layer 13 of the first substrate 11 in a state that the members are rotated at a predetermined revolving speed by, e.g., a spinner, although not shown, in place of the step [27]. Subsequently, the second substrate 21 which is prepared in advance by different steps is set on the first substrate 11 in a state that the second substrate 21 is facing a direction opposite to the surface on which the UV curing resin is diffused, the adhesive is removed by high-speed rotation (residual adhesive removing step) of the spinner, and then ultraviolet rays (UV rays) are applied. As a result, an optical disk is brought to completion.

Incidentally, when an inorganic material is used for the recoding layer, it is needless to say that the recording layer is formed to have a predetermined thickness by, e.g., a sputtering method.

Moreover, although the description has been given as to the example of attaching the substrates each having a thickness of 0.6 mm on each other in the foregoing embodiment, it goes without saying that the same advantages can be obtained when a cover layer having a thickness of 0.1 mm is attached on the substrate having a thickness of 1.1 mm, for example.

FIG. 3 shows a structure of a groove of the optical disk according to the present invention. It is to be noted that, although described above, this corresponds to a pit (prepit) formed on the original disk exposure stage of the step [23] depicted in FIG. 2.

As shown in FIG. 3, each dimension of the pit, i.e., the groove having the pit formed thereto is specified to be within a range of ±15% of the following expression:

$$(n_1-n_2)\cdot d_1 + n_2\cdot d_2 = (2n-1)\cdot \lambda/4 \quad (1)$$

wherein $n_1$ is a refractive index of the first substrate 11, $n_2$ is a refractive index of a dye (color material) of the organic dye film laminated on the first substrate, $\lambda$ is a wavelength of laser beams used for recording and reproduction of information, $d_1$ is a depth of the pit formed on the first substrate 11, $d_2$ is a depth of the pit on the organic dye film 12 laminated on the substrate, and m is an integer (m=1, 2, 3, 4 . . . ).

A left side in Expression (1) corresponds to a light path difference between light beams reflected from a reflection film at a pit bottom portion and light beams reflected from the reflection film at a part where there is no pit.

When this light path difference is odd-number-fold of ¼ of the wavelength, a tracking error signal based on the push-pull scheme has a maximum depth, and this is a dimension with which tracking is stabilized at the maximum level.

As describe with reference in FIG. 2, since depths of the pit and the groove are determined based on the thickness of the photoresist 303 applied at the step [22], the pit depth is usually equal to the groove depth.

However, the depth of the groove is optimum when its light path difference is odd-number-fold of ¼ of the wavelength, whereas the depth of the pit is optimum with which the signal amplitude becomes maximum when its light path difference is odd-number-fold of ½ of the wavelength.

The depths of the current optical disk (e.g., a DVD-RAM) having both the pit and the groove are set so that their light path differences become approximately ⅓ of the wavelength in order to realize the excellent pit and groove signals.

By setting in this manner, the necessary reproduction signal characteristics can be sufficiently assured in both the pit and the groove.

On the other hand, in the case of a direct-read-after-write optical disk in which a wavelength of laser beams used for recording and reproduction of information is approximately 400 nm, since a pitch of tracks (distance between grooves) is very dense, a depth of a groove must be selected in such a manner that a tracking error signal becomes maximum. It is to be noted that an excellent reproduction signal (track error signal) can be obtained in the optical disk having a groove formed thereto based on the condition shown in Expression (1).

However, even if a depth of a pit (groove) is specified in accordance with Expression (1), there may be a case that an amplitude of the reproduction signal cannot be sufficiently obtained from a pit (prepit) portion.

That is, in the direct-read-after-write optical disk using an organic dye as a material of a recording film, the amplitude of the reproduction signal is also dependent on how much dye exists in the pit (i.e., $d_2$ in (1)).

It is to be noted that since how much dye exists in the pit is also affected by a parameter of a shape of the pit as typified by, e.g., a pit width (pit with a narrower width is filled with a larger quantity of dye, and $d_2$ becomes small). Since, shape of the pit with which a preferred reproduction signal quantity can be assured is tested.

A confirmation test is carried out with $n_1=1.6$, $n_2=2.5$, $d_1=90$ nm, $d_2=70$ nm and $\lambda=400$ nm being set. It is to be noted that these values can of course be any values as long as they can satisfy Expression (1).

Figure 4:
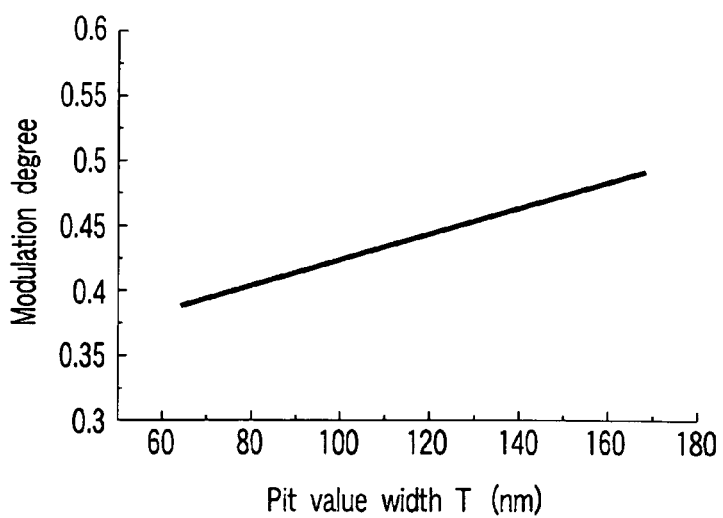
FIG. 4 is a schematic view illustrating a relationship between a width of the prepit (groove including a pit) formed on the recording film composed of the organic dye depicted in FIG. 1 and a quality of a reproduction signal.

FIG. 4 shows that a result of measurement of a modulation degree of a reproduction signal (percentage of a reproduction signal amplitude with respect to a maximum value of the reproduction signal) when a width T (nm) of the pit is actually changed.

As apparent from FIG. 4, since it is desirable that 0.4 or above is required for the modulation degree in order to reproduce an excellent signal, 80 (half-value width) nm or above is required for the width T of the pit (groove with the pit).

Figure 5:
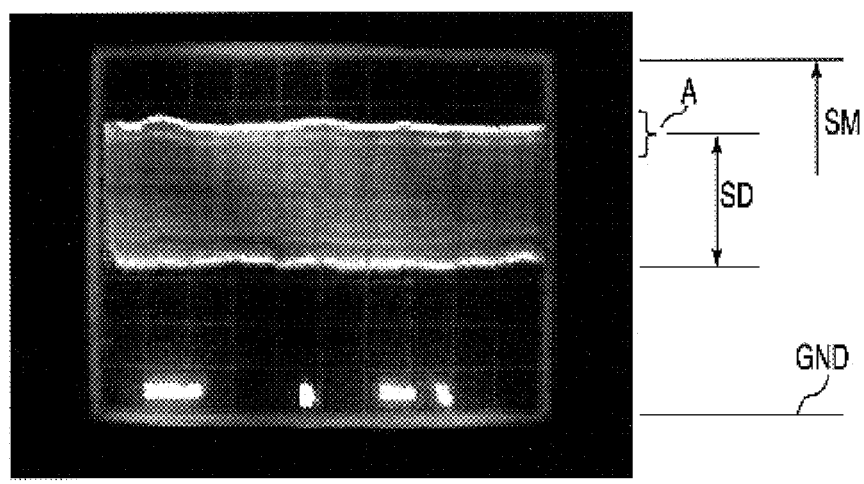
FIG. 5 is a photograph illustrating an example of a reproduction signal obtained by reproducing the prepit (groove including a pit) formed on the recording film composed of the organic dye depicted in FIG. 1.

On the other hand, when the pit width T is extended to 170 (half-value width) nm, such a reproduction signal as shown in FIG. 5 is obtained.

As apparent from FIG. 5 (photograph), an area between a "GND" line and an [SM] line (intensity of reflected light beams from a mirror surface area is determined as a full scale) is determined as a dynamic range for measurement, and it can be confirmed that the wobble is included in the reproduction signal in the vicinity of a peak indicated by "A" in the range of the reproduction signal "SD" when the reproduction signal is displayed.

It can be recognized that this wobble is derived from irregularities in the filling state ($d_2$) of the dye which has entered the pit (groove), and it was confirmed that it reaches approximately 5% of SD under the condition that the pit width T is T≦170 nm.

Therefore, it is preferable that the width T of the groove to which the pit is formed is determined as 80≦T≦170 m in terms of the half-value width (central value of a section excluding an upper limit 10% and a lower limit 10%).

Based on this, when the pit depth is specified in Expression (1) and the pit width T is set between 80 to 170 nm, it is possible to produce the direct-read-after-write optical disk by which tracking can be stably controlled and the reproduction signal from the pit portion is excellent.

As described above, according to the present invention, 40% or above can be assured as the reproduction signal modulation degree when the half-value width of the prepit is determined to be not less than 80 nm even if the pit is filled with the organic dye material and, on the other hand, the half-value width of the prepit is determined as 170 nm as a boundary point at which irregularities (unevenness) are apt to be generated in a quantity of the dye which has entered the pit, thereby suppressing occurrence of the wobble in the reproduction signal. As a result, it is possible to obtain an optical disk which is unaffected by occurrence of the wobble in the reproduction signal which is caused due to irregularities in the filling state of the dye if the half-value width of the prepit exceeds 170 nm. Therefore, there can be obtained an optical disk from which prerecorded physical information can be accurately reproduced.

Moreover, according to the present invention, in the optical disk in which a wavelength of light beams used for recording and reproduction of information is approximately 400 nm, since the tracking error signal for tracking can be readily obtained, information can be stably recorded and reproduced. The depth of the groove for this purpose is specified in Expression (1) with which the tracking error signal has a maximum value, thereby enabling stable reproduction of the signal. In this case, it is desirable that the depth of the groove is equal to that of the pit for the original disk manufacturing process. It is also preferable for the depth of the pit to likewise comply with Expression (1).

Additionally, according to the present invention, in the optical disk in which the organic dye material is used for the recording film and physical information is previously recorded, the prerecorded physical information can be prevented from being inaccurately read due to the influence of a thickness or a quantity of the organic dye material.

It is to be noted that the present invention is not restricted to the foregoing embodiments, and various modifications or changes can be carried out without departing from the scope of the invention on the embodying stage. Further, the foregoing embodiments may be appropriately combined with each other and carried out as long as such combinations are possible and, in such a case, advantages can be obtained from the combinations.

What is claimed is:

1. An optical disk comprising:
a recording film which includes an organic dye material with which information can be recorded when applied with light beams having a predetermined wavelength;
a substrate which holds the recording film together with a prepit that is used to guide the light beams having the predetermined wavelength and has a half-value width which is not less than 80 nm and not more than 170 nm;
a reflection film which is provided with a predetermined thickness on a side opposite to the substrate side of the recording film; and
a second substrate which is affixed to the reflection film through a bonding layer.

2. The optical disk according to claim 1, wherein the wavelength of the light beams utilized for record or reproduction of information has a central wavelength of 405 nm.

3. The optical disk according to claim 1, wherein a depth of the guide grove is in a range of ±15% of the following expression:

$$(n_1-n_2) \cdot d_1 + n_2 \cdot d_2 = (2m-1) \cdot \lambda/4$$

wherein
$n_1$: a refractive index of the first substrate,
$n_2$: a refractive index of the recording film,
$\lambda$: a wavelength of light beams used for recording and reproduction of information,
$d_1$: a depth of the prepit,
$d_2$: a depth of the recording film positioned on the prepit, and
m: an integer (m=1, 2, 3, 4 . . . ).

4. The optical disk according to claim 3, wherein the light beams utilized for record or reproduction of information have a central wavelength of 405 nm.

5. An optical disk comprising:
a recording film which includes an organic dye material with which information can be recorded when applied with light beams having a predetermined wavelength;
a substrate which includes a prepit specified by the following conditions in order to guide the light beams having the predetermined wavelength:

$$(n_1-n_2) \cdot d_1 + n_2 \cdot d_2 = (2m-1) \cdot \lambda/4$$

wherein
$n_1$: a refractive index of the first substrate,
$n_2$: a refractive index of the recording film,
$\lambda$: a wavelength of light beams used for recording and reproduction of information,
$d_1$: a depth of the prepit,
$d_2$: a depth of the recording film positioned on the prepit, and
m: an integer (m=1, 2, 3, 4 . . . );
a reflection film which is provided with a predetermined thickness on a side opposite to the substrate side of the recording film; and
a second substrate which is affixed to the reflection film through a bonding layer.

6. The optical disk according to claim 5, wherein the wavelength of the light beams utilized for record or reproduction of information has a central wavelength of 405 nm.

7. The optical disk according to claim 5, wherein, when the optical disk has a hole having an inside diameter of 15 mm and has an outside diameter of 120 mm, a change in the recording speed of the prepit which is formed with a width which is not less than 80 nm and not more than 170 nm in terms of a half-value width at least in an area whose radius from the center is 23.3 to 23.8 mm and an area whose radius from the center is 57.9 to 58.0 mm is inputted as a change in a constant B.

8. The optical disk according to claim 7, wherein the wavelength of the light beams utilized for record or reproduction of information has a central wavelength of 405 nm.

9. A method for manufacturing the optical disk comprising a recording film having an organic dye material as a recording material with which information can be recorded when applied with light beams of predetermined wavelength, a substrate which holds the recording film together with a prepit used to guide the light beams with the predetermined wavelength, a reflection film provided with a predetermined thickness on a side opposite to the substrate side of the recording film, and a second substrate which is affixed to the reflection film through a bonding layer, and a hole with an inside diameter of 15 mm and outside diameter of 120 mm, the method comprising:
forming, in an area having a radius from the center is 23.3 to 23.8 mm and an area having a radius from the center is 57.9 to 58.0 mm, the prepit having physical information of a half-value width of not less than 80 nm and not more than 170 nm as well as a depth which is in a range of ±15% of the following expression:

$$(n_1-n_2)\cdot d_1+n_2\cdot d_2=(2m-1)\cdot \lambda/4$$

wherein
$n_1$: a refractive index of the first substrate,
$n_2$: a refractive index of the recording film,
$\lambda$: a wavelength of light beams used for recording and reproduction of information,
$d_1$: a depth of the prepit,
$d_2$: a depth of the recording film positioned on the prepit, and
m: an integer (m =1, 2, 3, 4 . . . );
forming the reflection film on the substrate having the prepit provided thereto;
providing the bonding layer on the reflection film; and
bonding the second substrate through the bonding layer.

* * * * *